(12) United States Patent
Nomura et al.

(10) Patent No.: US 9,556,593 B2
(45) Date of Patent: Jan. 31, 2017

(54) DISPLAY SYSTEM OF EXCAVATING MACHINE AND EXCAVATING MACHINE

(71) Applicant: Komatsu Ltd., Tokyo (JP)

(72) Inventors: Azumi Nomura, Fujisawa (JP); Masao Yamamura, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/429,125

(22) PCT Filed: Nov. 8, 2013

(86) PCT No.: PCT/JP2013/080308
§ 371 (c)(1),
(2) Date: Mar. 18, 2015

(87) PCT Pub. No.: WO2014/077202
PCT Pub. Date: May 22, 2014

(65) Prior Publication Data
US 2015/0218781 A1   Aug. 6, 2015

(30) Foreign Application Priority Data

Nov. 14, 2012   (JP) .................................. 2012-250545

(51) Int. Cl.
*G06F 7/70* (2006.01)
*E02F 9/26* (2006.01)
(Continued)

(52) U.S. Cl.
CPC .............. *E02F 9/264* (2013.01); *E02F 3/435* (2013.01); *E02F 9/261* (2013.01); *G01S 19/14* (2013.01);
(Continued)

(58) Field of Classification Search
None
See application file for complete search history.

(56) References Cited

U.S. PATENT DOCUMENTS

2005/0027420 A1   2/2005   Fujishima et al.
2009/0293012 A1*  11/2009  Alter .................. G01C 21/20
                                                          715/810
(Continued)

FOREIGN PATENT DOCUMENTS

CN   101550712 A   10/2009
CN   201857637 U   6/2011
(Continued)

OTHER PUBLICATIONS

International Search Report mailed Jan. 28, 2014, issued for PCT/JP2013/080308.

*Primary Examiner* — Adam Alharbi
(74) *Attorney, Agent, or Firm* — Locke Lord LLP

(57) ABSTRACT

A display system of an excavating machine that includes a work machine having a bucket, and a main body to which the work machine is attached, the display system includes: a storage unit configured to store at least position information of a design surface; a display unit configured to display the position information of the design surface on a screen; and a processing unit configured to display an outer edge of a second plane of the design surface, the second plane including a first plane existing in the design surface, the second plane existing in a part of a periphery of the first plane, on the screen of the display unit, in a different form from inside and outside of the outer edge.

10 Claims, 11 Drawing Sheets

(51) Int. Cl.
*E02F 3/43* (2006.01)
*G01S 19/14* (2010.01)
*G01S 19/53* (2010.01)
*G09G 5/02* (2006.01)
*G09G 5/37* (2006.01)

(52) U.S. Cl.
CPC .............. *G01S 19/53* (2013.01); *G09G 5/02* (2013.01); *G09G 5/37* (2013.01); *G09G 2320/08* (2013.01); *G09G 2320/10* (2013.01); *G09G 2354/00* (2013.01); *G09G 2380/10* (2013.01)

(56) References Cited

U.S. PATENT DOCUMENTS

| | | | | |
|---|---|---|---|---|
| 2012/0112531 | A1* | 5/2012 | Kesler | B60L 11/182 307/9.1 |
| 2013/0073387 | A1* | 3/2013 | Heath | G06Q 50/01 705/14.53 |
| 2014/0316837 | A1* | 10/2014 | Fosburgh | G06Q 10/06312 705/7.22 |

FOREIGN PATENT DOCUMENTS

| | | |
|---|---|---|
| JP | 11-094550 A | 4/1999 |
| JP | 2001-125649 A | 5/2001 |
| JP | 2001-125949 A | 5/2001 |
| JP | 2004-107925 A | 4/2004 |
| JP | 2004-107926 A | 4/2004 |

\* cited by examiner

DISPLAY SYSTEM OF EXCAVATING MACHINE AND EXCAVATING MACHINE

FIELD

The present invention relates to a display system of an excavating machine and an excavating machine including the display system.

BACKGROUND

Typically, an operator operates an operation lever of an excavating machine, such as an excavator, so that a work machine including a bucket is driven, and the excavating machine excavates the ground of a working target. To assist the operator in such excavation work, a technology that guides a target excavation surface has been proposed (for example, Patent Literature 1).

CITATION LIST

Patent Literature

Patent Literature 1: Japanese Patent Application Laid-open No. 2004-107925

SUMMARY

Technical Problem

The technology disclosed in Patent Literature 1 displays, in display means, a large number of small planes that configures a three-dimensional target landform, and an illustration of the whole or a part of a construction machine including a main body of the construction machine and at least a tip portion of a work machine, as a first screen, and identifies and displays, on the first screen, small planes having normal directions that are parallel with a working surface of the work machine within an allowable error range, of the large number of small planes that configures a three-dimensional target landform, as a target excavation surface.

By the way, the target landform may be displayed not only in the three-dimensional manner but also in a two-dimensional manner in the display device. For example, the target landform may sometimes be displayed in the display device with a two-dimensional image as viewed from above the construction machine. In this case, when the target landform has different planes, it may be difficult to distinguish and display the planes. As a result, information related to the construction may not be provided to the operator of the excavating machine, who visually recognizes a design surface of a construction target displayed in the display device, in an easily understandable manner.

An objective of the present invention is to provide the operator with information related to construction in an easily understandable manner, when the operator of an excavating machine proceeds with the construction according to a design surface.

Solution to Problem

According to the present invention, a display system of an excavating machine that includes a work machine having a bucket, and a main body to which the work machine is attached, the display system comprises: a storage unit configured to store at least position information of a design surface; a display unit configured to display the position information of the design surface on a screen; and a processing unit configured to display an outer edge of a second plane of the design surface, the second plane including a first plane existing in the design surface, the second plane existing in a part of a periphery of the first plane, on the screen of the display unit, in a different form from inside and outside of the outer edge.

In the present invention, it is preferable that the design surface is divided by a plurality of surface elements, the first plane is one of the plurality of surface elements, and the second plane is at least one of the plurality of surface elements, the one existing in the periphery of the first plane, and is able to be considered to exist in a same plane as the surface element corresponding to the first plane.

In the present invention, it is preferable that the processing unit displays the position information of the design surface, the outer edge, and a pattern corresponding to the excavating machine, on a same screen of the display unit.

In the present invention, it is preferable that the processing unit displays a plurality of the different first planes, and the outer edges of the second planes corresponding to the respective first planes, on a same screen of the display unit, in different forms from the inside and outside of the outer edges.

In the present invention, it is preferable that the processing unit displays light and shade that occurs when the design surface is irradiated with light from a predetermined direction, on the screen of the display unit, together with the design surface.

In the present invention, it is preferable that the processing unit irradiates the design surface with the light from a position of a light attached to the excavating machine.

In the present invention, it is preferable that the display system of an excavating machine comprises: a display switching unit configured to transmit a display switching command for displaying the inside of the outer edge in a different form from the outside of the outer edge, wherein when the processing unit receives the display switching command from the display switching unit, the processing unit displays the inside of the outer edge, on the screen of the display unit, in a different form from the outside of the outer edge.

In the present invention, it is preferable that the processing unit displays at least the outer edge of the second plane existing directly below the bucket, on the screen of the display unit, in a different form from the inside and the outside of the outer edge.

According to the present invention, a display system of an excavating machine that includes a work machine having a bucket, and a main body to which the work machine is attached, the display system comprises: a storage unit configured to store at least position information of a design surface divided by a plurality of surface elements; a display unit configured to display the position information of the design surface on a screen; a vehicle state detection unit configured to detect at least information related to a current position of the excavating machine; and a processing unit configured to display an outer edge of a second plane of the design surface, the second plane including a first plane existing in the design surface, the second plane existing in a part of a periphery of the first plane, on the screen of the display unit, in a different form from inside and outside of the outer edge, and further to display a pattern corresponding to the excavating machine, on the same screen as the outer edge of the second plane, wherein the second plane exists in a range surrounded by two planes existing in positions away from the first plane by a predetermined distance, in a direction perpendicular to the first plane.

According to the present invention, an excavating machine comprises: a display system of the excavating machine.

ADVANTAGEOUS EFFECTS OF INVENTION

The present invention can provide an operator with information related to construction in an easily understandable manner, when the operator of an excavating machine proceeds with the construction according to a design surface.

DESCRIPTION OF EMBODIMENTS

Embodiments for implementing the present invention (embodiments) will be described in detail with reference to the drawings. In the embodiments below, an excavator will be described as an example of an excavating machine. However, an excavating machine targeted in the embodiments below is not limited to the excavator as long as the excavating machine is a construction machine that works, mounting an attachment such as a bucket. For example, the excavating machine targeted in the present embodiment may be applied to a backhoe loader.

<Overall Configuration of Excavating Machine>

Figure 1:
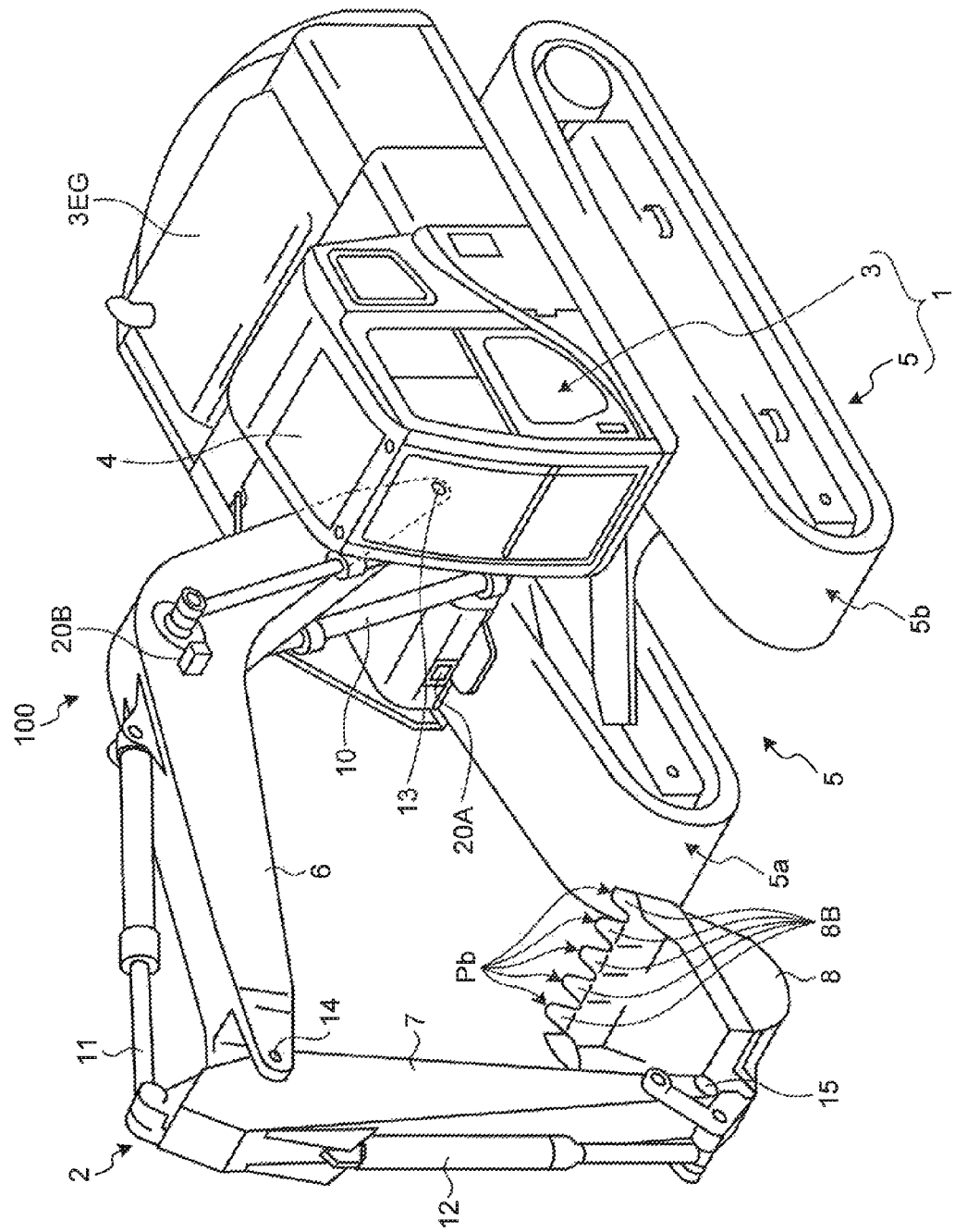
FIG. 1 is a perspective view of an excavator 100 according to the present embodiment.
Figure 2:
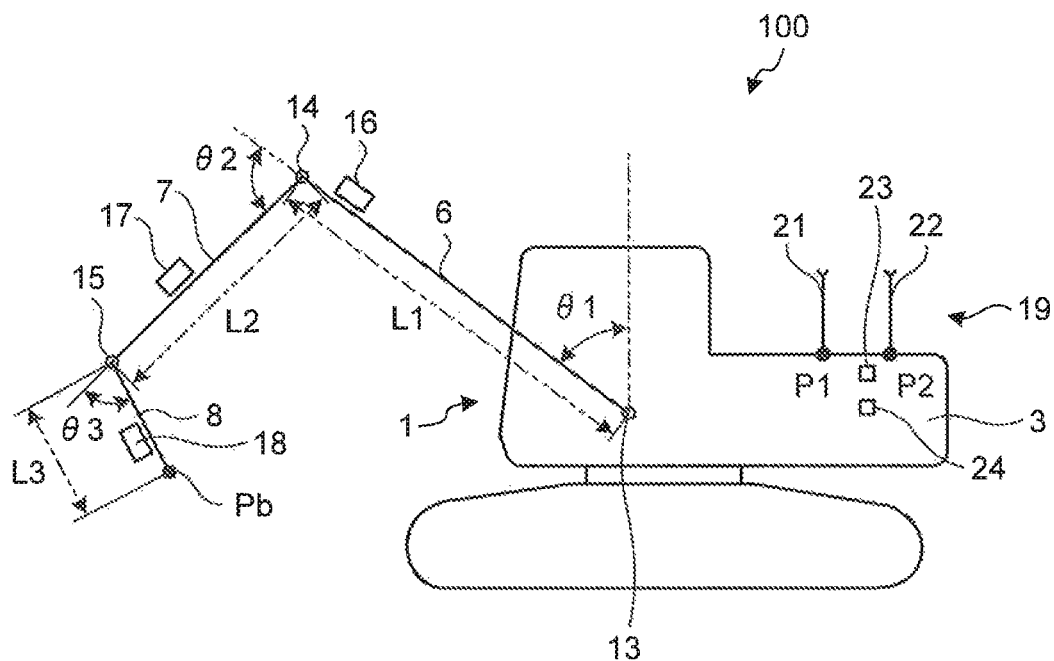
FIG. 2 is a side view of the excavator 100.
Figure 3:
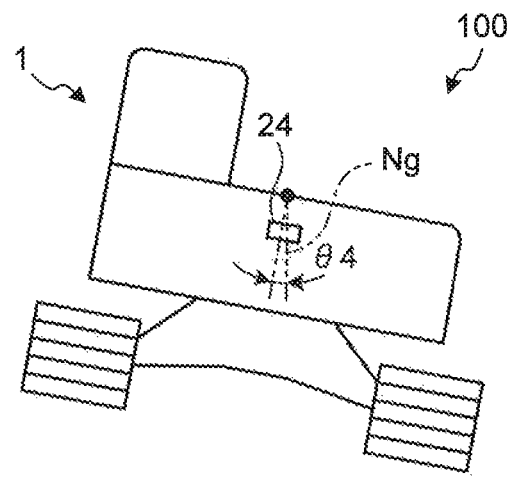
FIG. 3 is a back view of the excavator 100.
Figure 4:
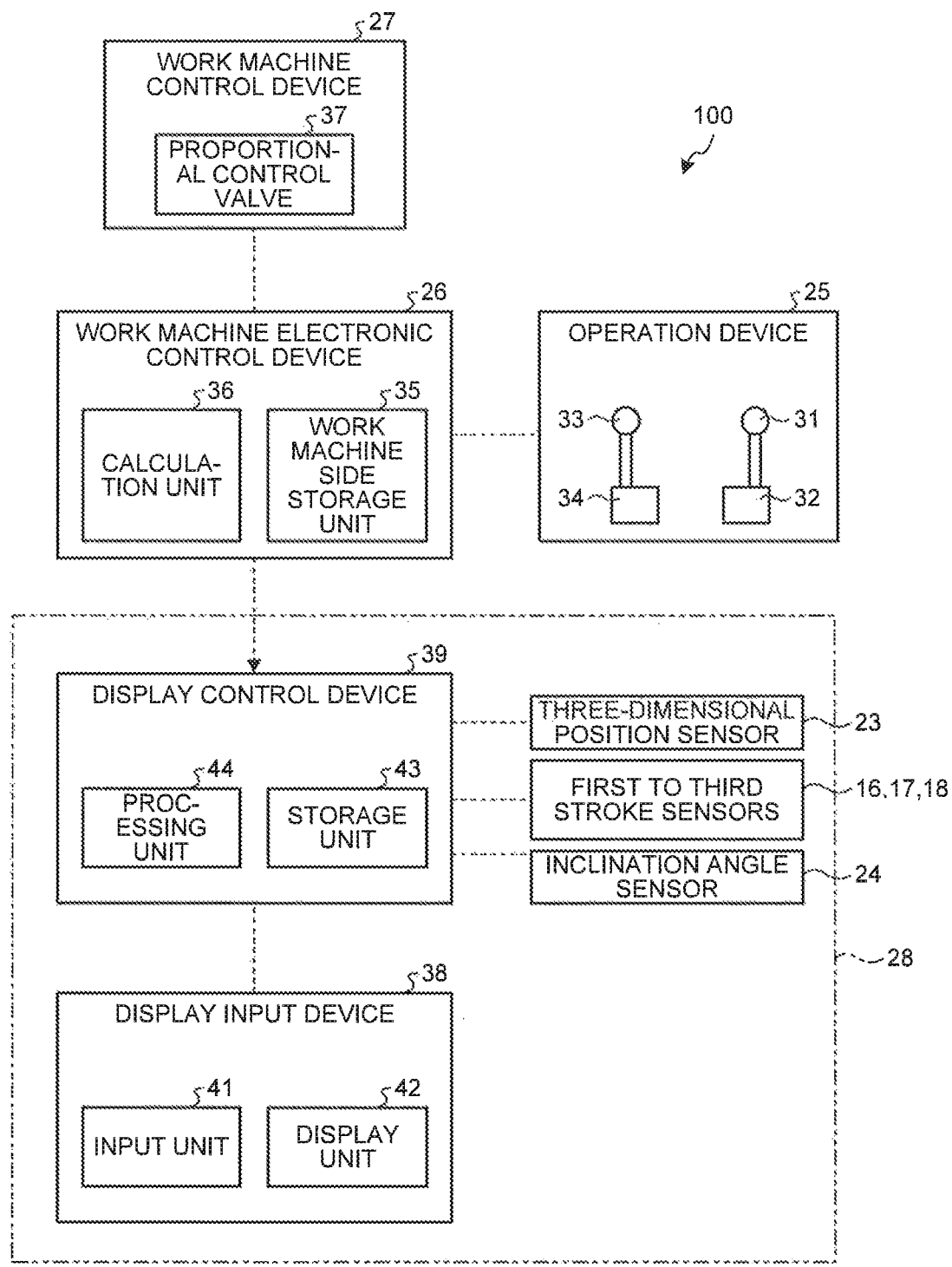
FIG. 4 is a block diagram illustrating a control system included in the excavator 100.
Figure 5:
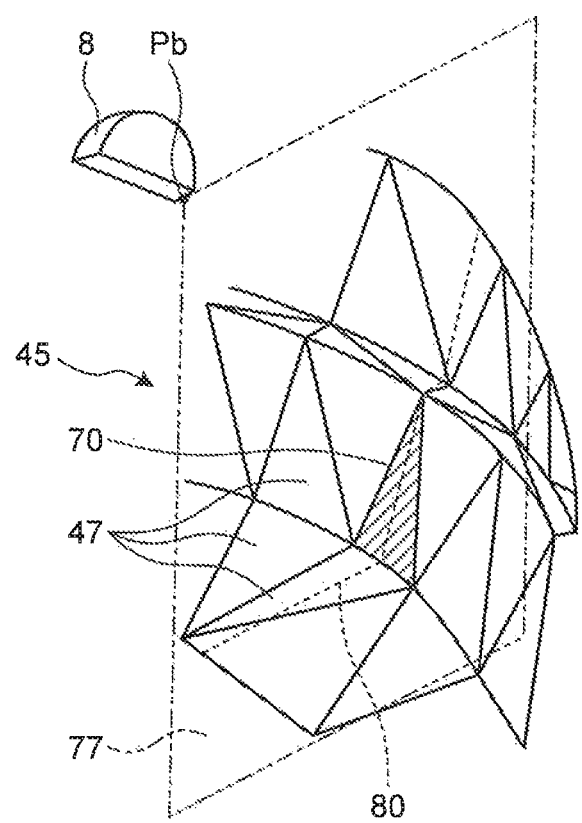
FIG. 5 is a diagram illustrating a design landform indicated by design landform data.

FIG. 1 is a perspective view of an excavator 100 according to the present embodiment. FIG. 2 is a side view of the excavator 100. FIG. 3 is a back view of the excavator 100. FIG. 4 is a block diagram illustrating a control system included in the excavator 100. FIG. 5 is a diagram illustrating a design landform indicated by design landform data. In the present embodiment, the excavator 100 as the excavating machine includes a vehicle body 1 as a main body and a work machine 2. The vehicle body 1 includes an upper swing body 3 and a traveling device 5. The upper swing body 3 houses devices such as a power generation device and a hydraulic pump inside an engine room 3EG. The engine room 3EG is arranged at one end side of the upper swing body 3.

In the present embodiment, the excavator 100 uses an internal-combustion engine such as a diesel engine, as the power generation device. However, the excavator 100 is not limited thereto. The excavator 100 may be a power generation device in a so-called hybrid-system device, which is a combination of an internal-combustion engine, a generator motor, and a storage device.

The upper swing body 3 includes an operator cab 4. The operator cab 4 is arranged at the other end side of the upper swing body 3. That is, the operator cab 4 is arranged at a side opposite to the side where the engine room 3EG is arranged. Inside the operator cab 4, a display input device 38 and an operation device 25 as illustrated in FIG. 4 are arranged. These devices will be described below. The traveling device 5 includes caterpillar bands 5a and 5b. The traveling device 5 travels as a hydraulic motor (not illustrated) is driven and the caterpillar bands 5a and 5b are rotated, and allows the excavator 100 to travel. The work machine 2 is attached to a side of the operator cab 4 of the upper swing body 3.

The excavator 100 may include tires instead of the caterpillar bands 5a and 5b, and may include a traveling device that can travel by transmitting driving force of a diesel engine to the tires through a transmission. An example of such an excavator 100 includes a wheel-type excavator. Further, the excavator 100 may be a backhoe loader that includes such a traveling device having tires, further includes a work machine attached to the vehicle body (main body unit), and has a structure including neither the upper swing body as illustrated in FIG. 1 or a swing mechanism thereof. That is, the backhoe loader has the work machine attached to the vehicle body, and a traveling device that constitutes a part of the vehicle body.

In the upper swing body 3, the side where the work machine 2 and the operator cab 4 are arranged is a front side, and the side where the engine room 3EG is arranged is a back side. Facing front, the left side is the left of the upper swing body 3, and the right side facing the front is the right of the upper swing body 3. In the excavator 100 or the vehicle body 1, the side of the traveling device 5 is a downside based on the upper swing body 3, and the side of the upper swing body 3 is an upside based on the traveling device 5. In a case where the excavator 100 is arranged on a horizontal plane, the downside is a vertical direction, that is, in the direction of action of gravity, and the upside is in a direction opposite to the vertical direction.

The work machine 2 includes a boom 6, an arm 7, a bucket 8, a boom cylinder 10, an arm cylinder 11, and a bucket cylinder 12. A base end portion of the boom 6 is swingably attached to a front portion of the vehicle body 1 through a boom pin 13. A base end portion of the arm 7 is swingably attached to a tip portion of the boom 6 through an arm pin 14. The bucket 8 is swingably attached to a tip portion of the arm 7 through a bucket pin 15.

As illustrated in FIG. 2, the length of the boom 6, that is, the length from the boom pin 13 to the arm pin 14 is L1. The length of the arm 7, that is, the length from a center of the arm pin 14 to a center of the bucket pin 15 is L2. The length of the bucket 8, that is, the length from the center of the bucket pin 15 to a blade tip Pb of the bucket 8 is L3. The blade tip Pb is a tip of a blade 8B attached to the bucket 8 at a side opposite to the bucket pin 15.

The boom cylinder 10, the arm cylinder 11, and the bucket cylinder 12 illustrated in FIG. 1 are hydraulic cylinders respectively driven by pressure of a working oil (hereinafter, appropriately referred to as hydraulic oils). The boom cylinder 10 drives the boom 6, and moves the boom 6 up and down. The arm cylinder 11 drives the arm 7, and allows the arm 7 to revolve around the arm pin 14. The bucket cylinder 12 drives the bucket 8, and allows the bucket 8 to revolve around the bucket pin 15. Between the hydraulic cylinders of the boom cylinder 10, the arm cylinder 11, and the bucket cylinder 12, and a hydraulic pump not illustrated, a proportional control valve 37 illustrated in FIG. 4 is arranged. A work machine electronic control device 26 described below controls the proportional control valve 37, so that flow rates of the working oils supplied to the boom cylinder 10, the arm cylinder 11, and the bucket cylinder 12 are controlled. As a result, operations of the boom cylinder 10, the arm cylinder 11, and the bucket cylinder 12 are controlled.

A light 20A, which irradiates a side of the bucket 8 of the work machine 2 with light, is attached to the upper swing body 3 at a side of the work machine 2. Further, a light 20B, which irradiates the side of the bucket 8 of the work machine 2 with light, is attached to the boom 6 of the work machine 2. With the lights 20A and 20B, work in the evening or in the night is facilitated.

As illustrated in FIG. 2, a first stroke sensor 16, a second stroke sensor 17, and a third stroke sensor 18 are respectively provided to the boom 6, the arm 7, and the bucket 8. The first stroke sensor 16, the second stroke sensor 17, and the third stroke sensor 18 are posture detection units that detect postures of the work machine 2. The first stroke sensor 16 detects a stroke length of the boom cylinder 10. A display control device 39 described below (see FIG. 4) calculates an inclination angle $\theta1$ of the boom 6 with respect to a Za axis of a vehicle body coordinate system described below, from the stroke length of the boom cylinder 10, which is detected by the first stroke sensor 16. The second stroke sensor 17 detects a stroke length of the arm cylinder 11. The display control device 39 calculates an inclination angle $\theta2$ of the arm 7 with respect to the boom 6, from the stroke length of the arm cylinder 11, which is detected by the second stroke sensor 17. The third stroke sensor 18 detects a stroke length of the bucket cylinder 12. The display control device 39 calculates an inclination angle $\theta3$ of the bucket 8 with respect to the arm 7, from the stroke length of the bucket cylinder 12, which is detected by the third stroke sensor 18.

The vehicle body 1 includes a position detection unit 19. The position detection unit 19 detects a current position of the excavator 100. The position detection unit 19 includes two antennas 21 and 22 (hereinafter, appropriately referred to as GNSS antennas 21 and 22), which are used for real time kinematic-global navigation satellite systems (RTK-GNSS), a three-dimensional position sensor 23, and an inclination angle sensor 24. The GNSS antennas 21 and 22 are installed in the vehicle body 1, more specifically, installed in the upper swing body 3. In the present embodiment, the GNSS antennas 21 and 22 are installed by being separated by a certain distance along a Ya axis of the vehicle body coordinate system described below. Note that the position of the excavating machine and a vehicle state such as a posture can be detected by the position detection unit 19 and the above-described posture detection unit (by these vehicle state detection units).

Note that the GNSS antennas 21 and 22 are favorably installed above the upper swing body 3, and at both end positions on the excavator 100, which are separated in a right and left direction. Alternatively, the GNSS antennas 21 and 22 may be installed above the upper swing body 3, and on a counter weight (not illustrated) (at a rear end of the upper swing body 3), or posterior to the operator cab 4. In either case, detection accuracy of the current position of the excavator 100 is improved when the GNSS antennas 21 and 22 are installed at positions as far as possible. In addition, the GNSS antennas 21 and 22 are favorably installed at positions not to disturb the view of the operator as much as possible. Further, the current position of the excavating machine (the excavator 100 in the present embodiment) and the vehicle state such as a posture can be detected by the position detection unit 19 and the posture detection unit (by these vehicle state detection units).

Signals according to GNSS radio waves received by the GNSS antennas 21 and 22 are input to the three-dimensional position sensor 23. The three-dimensional position sensor 23 detects installation positions P1 and P2 of the GNSS antennas 21 and 22. As illustrated in FIG. 3, the inclination angle sensor 24 detects an inclination angle $\theta4$ (hereinafter, appropriately referred to as roll angle $\theta4$) in a width direction of the vehicle body 1 with respect to a direction into which the gravity acts, that is, a vertical direction Ng. Note that, in the present embodiment, the width direction means a width direction of the bucket 8, and accords with a width direction of the upper swing body 3, that is, a right and left direction. However, when the work machine 2 includes a tilt bucket described below, the width direction of the bucket 8 and the width direction of the upper swing body 3 may not accord with each other.

The excavator 100 includes the operation device 25, the work machine electronic control device 26, a work machine control device 27, and a display system of excavating machine (hereinafter, appropriately referred to as display system) 28. The operation device 25 includes a work machine operation member 31, a work machine operation detection unit 32, a travel operation member 33, and a travel operation detection unit 34. The work machine operation member 31 is a member used by the operator for operating the work machine 2, and is, for example, a joystick or an operation lever. Further, there are two pairs of the work machine operation members 31 and the work machine operation detection units 32 (only one pair is illustrated in FIG. 4). The work machine operation members 31 are installed to the right and left of an operator's seat (not illustrated) in the operator cab 4. For example, by operating the work machine operation member 31 installed to the right, the operator can operate the bucket 8 and the boom 6, and by operating the work machine operation member 31 installed to the left, the operator can operate the arm 7 and the upper swing body 3. The work machine operation detection units 32 detects operation details of the work machine operation members 31, and transmit the operation details to the work machine electronic control device 26, as detection signals.

The travel operation member 33 is a member used by the operator for operating traveling of the excavator 100, and is, for example, a joystick or an operation lever. Further, there are two pairs of the travel operation members 33 and the travel operation detection units 34 (only one pair is illustrated in FIG. 4). The travel operation members 33 are installed side by side in front of the operator's sear (not illustrated) in the operator cab 4. By operating the travel operation member 33 installed to the right, the operator can operate the caterpillar band 5a on the right side, and by operating the travel operation member 33 installed to the left, the operator can operate the caterpillar band 5b on the left. The travel operation detection units 34 detect operation details of the travel operation members 33, and transmit the operation details to the work machine electronic control device 26, as detection signals.

The work machine electronic control device 26 includes a work machine side storage unit 35 that includes at least one of a random access memory (RAM) and a read only memory (ROM), and a calculation unit 36 such as a central processing unit (CPU). The work machine electronic control device 26 mainly controls the work machine 2. The work machine electronic control device 26 generates a control signal for operating the work machine 2 in response to the operations of the work machine operation members 31, and outputs the control signal to the work machine control device 27. The work machine control device 27 includes the proportional control valve 37, and controls the proportional control valve 37, based on the control signal from the work machine electronic control device 26. The working oil at the flow rate according to the control signal from the work machine electronic control device 26 flows out through the proportional control valve 37, and is supplied to at least one of the boom cylinder 10, the arm cylinder 11, and the bucket cylinder 12. Then, the boom cylinder 10, the arm cylinder 11, and the bucket cylinder 12 illustrated in FIG. 1 are driven according to the working oil supplied from the proportional control valve 37. As a result, the work machine 2 is operated.

<Display System 28>

The display system 28 is a system for providing the operator with information for excavating a ground in a working area to form the ground into a shape like a design surface 45 described below. The display system 28 includes a display input device 38 and a display control device 39 as a display device, in addition to the three-dimensional position sensor 23, the inclination angle sensor 24, the first stroke sensor 16, the second stroke sensor 17, and the third stroke sensor 18.

The display input device 38 includes an input unit 41 in a touch panel system, and a display unit 42 such as a liquid crystal display (LCD) or the like. The display input device 38 displays a guide screen for providing the information for performing excavation. Further, various keys are displayed on the guide screen. The operator (a service man when inspecting or repairing the excavator 100) touches the various keys on the guide screen, thereby to execute various functions of the display system 28. The guide screen will be described in detail below.

The display control device 39 executes various functions of the display system 28. The display control device 39 is an electronic control device that includes a storage unit 43 including at least one of a RAM and a ROM, and a processing unit 44 such as a CPU. The storage unit 43 stores work machine data. The work machine data includes the length L1 of the boom 6, the length L2 of the arm 7, and the length L3 of the bucket 8. Further, the work machine data includes minimum values and maximum values of the inclination angle θ1 of the boom 6, the inclination angle θ2 of the arm 7, and the inclination angle θ3 of the bucket 8.

The display control device 39 and the work machine electronic control device 26 can communicate with each other through wireless or wired communication means. The storage unit 43 of the display control device 39 stores design landform data created in advance. The design landform data is information related to the shape and the position of a three-dimensional design landform. The design landform indicates a target shape of the ground to be worked (target landform). The display control device 39 causes the display input device 38 to display the guide screen, based on the design landform data and information such as detection results from the various sensors. To be specific, as illustrated in FIG. 5, the design landform is configured from the design surface 45 expressed by surface elements 47. That is, the design surface 45 includes at least one surface element 47. In the present embodiment, the surface element 47 is a plane element, and is, for example, a triangulated irregular network (TIN). The TIN is a digital data structure that expresses a ground surface with a set of triangles, to be used in a geographic information system (GIS). The TIN is also called irregular triangular network. The surface element 47 is not limited to the TIN, and may be a plane element of a rectangle, a pentagon, or the like.

A target work object is a part or the whole of the design surface 45. The operator selects one or a plurality of surface elements 47 of the design surface 45, as a target surface 70. The target surface 70 is a surface to be excavated, of the design surface 45 including the plurality of surface elements 47. The display control device 39 displays the guide screen for notifying the operator of the position of the target surface 70, in the display input device 38.

<Guide Screen>

Figure 6:
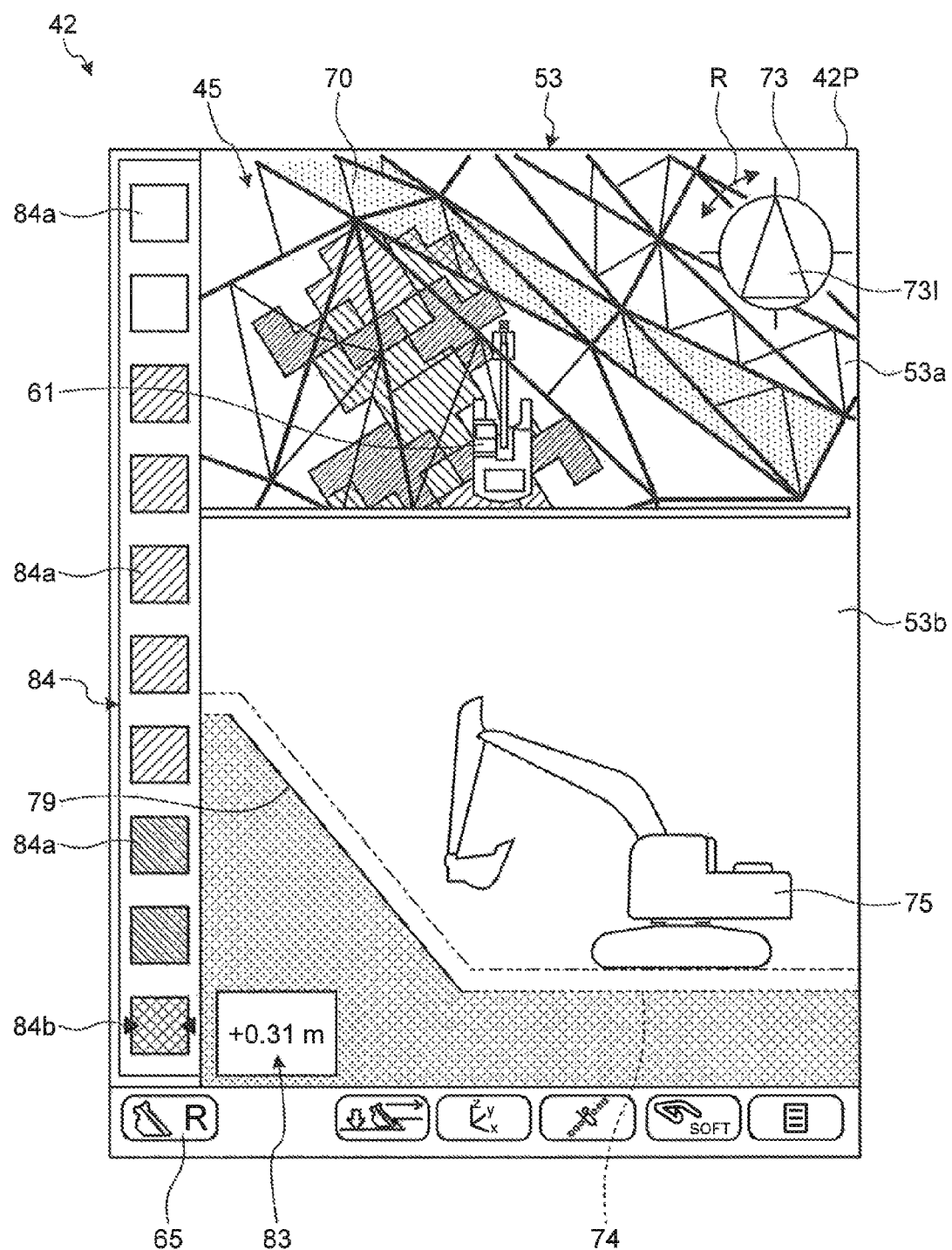
FIG. 6 is a diagram illustrating an example of a guide screen.
Figure 7:
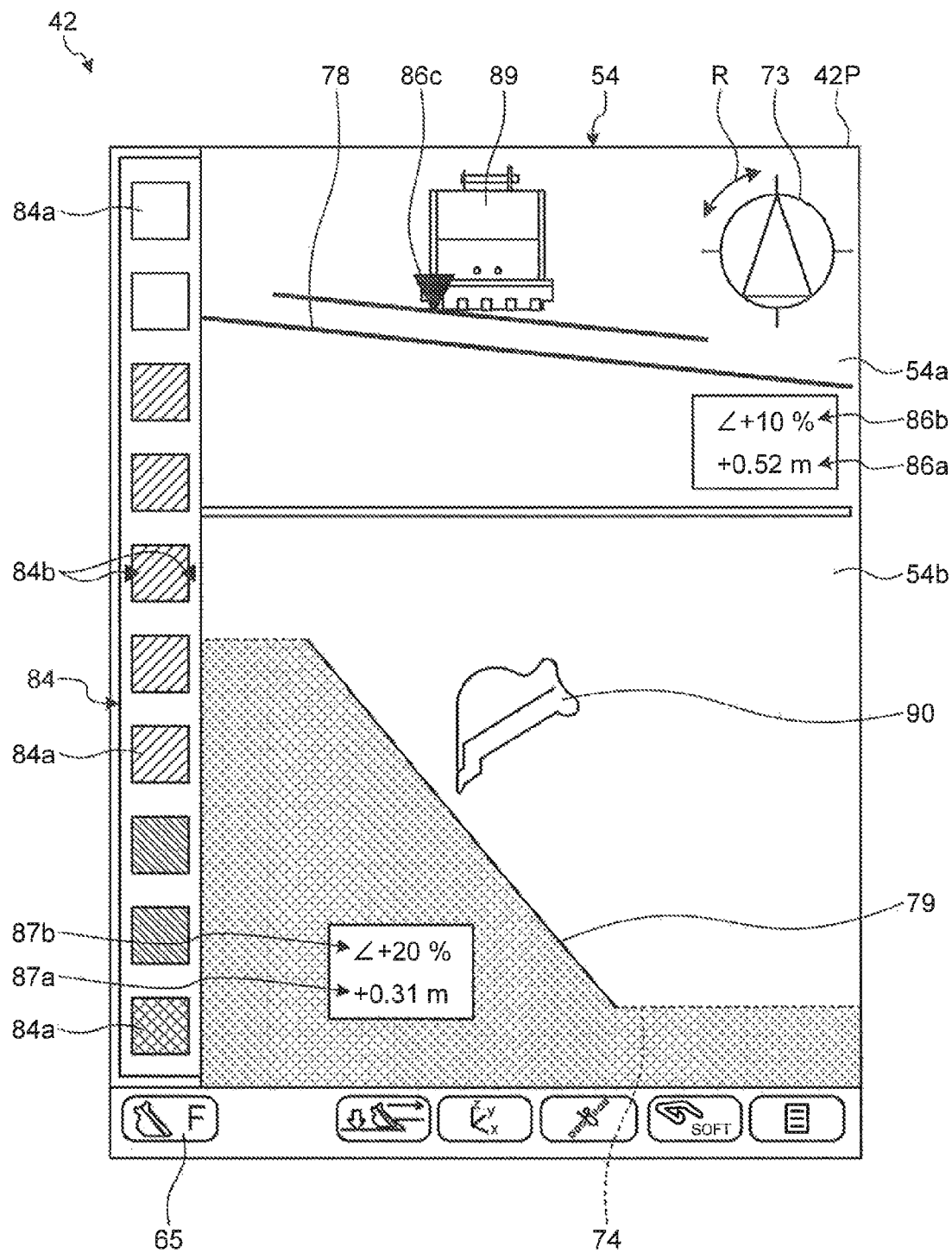
FIG. 7 is a diagram illustrating an example of the guide screen.

FIGS. 6 and 7 are diagrams illustrating an example of the guide screen. The guide screen indicates a positional relationship between the target surface 70 and the blade tip Pb of the bucket 8, and is a screen for guiding the work machine 2 of the excavator 100 so that the ground to be worked becomes to have the same shape as the target surface 70. As illustrated in FIGS. 6 and 7, the guide screen includes a guide screen of a rough excavation mode (hereinafter, appropriately referred to as rough excavation screen 53), and a guide screen of a fine excavation mode (hereinafter, appropriately referred to as fine excavation screen 54).

(Rough Excavation Screen 53)

The rough excavation screen 53 illustrated in FIG. 6 is displayed on a screen 42P of the display unit 42. The rough excavation screen 53 includes a top view 53a indicating the design landform of a working area (the design surface 45 including the target surface 70) and a current position of the excavator 100, and a side view 53b indicating a positional relationship between the target surface 70 and the excavator 100. The top view 53a of the rough excavation screen 53 expresses the design landform in a top view, with a plurality of triangular polygons. To be specific, the top view 53a expresses the design landform using a swing plane that is a plane on which the excavator 100 swings, as a projection surface. Therefore, the top view 53a is a bird's-eye view as viewed from directly above the excavator 100, and when the excavator 100 is tilted, the design surface 45 is tilted.

Further, the target surface 70 selected from the design surface 45 as the target work object is displayed in a different color from other portions of the design surface 45. Note that, in FIG. 6, the current position of the excavator 100 is indicated by an icon 61 of the excavator 100 in a top view. However, the current position of the excavator 100 may be indicated by another symbol. Further, the top view 53a includes information for causing the excavator 100 to face the target surface 70. The information for causing the excavator 100 to face the target surface 70 is displayed as a target surface facing compass 73. The target surface facing compass 73 is an icon, in which an arrow-shaped needle 731 is rotated in the arrow R direction to indicate a direction facing the target surface 70 and a direction into which the excavator 100 swings. The operator of the excavator 100 can confirm the degree of facing the target surface 70 with the target surface facing compass 73.

The side view 53b of the rough excavation screen 53 includes an image indicating a positional relationship between the target surface 70 and the blade tip Pb of the bucket 8, and distance information that indicates the distance between the target surface 70 and the blade tip Pb of the bucket 8. To be specific, the side view 53b includes a line 74 that indicates a cross section of the design surface 45, a line 79 that indicates a cross section of the target surface 70, and an icon 75 of the excavator 100 in side view. The line 74 that indicates a cross section of the design surface 45 indicates a cross section of the design surface 45, other than the target surface 70. The line 79 that indicates a cross section of the target surface 70 indicates the cross section of the target surface 70. The line 74 that indicates the cross section of the design surface 45 and the line 79 that indicates the cross section of the target surface 70 are obtained by calculating a line of intersection 80 of the plane 77 that passes through the current position of the blade tip Pb of the bucket 8, and the design surface 45, as illustrated in FIG. 5. The processing unit 44 of the display control device 39 obtains the line of intersection 80. A method of obtaining the current position of the blade tip Pb of the bucket 8 will be described below.

In the side view 53b, the line 79 that indicates the cross section of the target surface 70 is displayed in a different color from the line 74 that indicates the cross section of the design surface 45. Note that, in FIG. 6, the line 79 that indicates the cross section of the target surface 70 and the line 74 that indicates the cross section of the design surface 45 are expressed by lines of different line types. Further, in the side view 53b, a region on an underground side of the line 79 that indicates the cross section of the target surface 70 and the line 74 that indicates the cross section of the design surface 45, and a region on the air side of these lines are indicated in different colors. In FIG. 6, the region on an underground side of the line 79 that indicates the cross section of the target surface 70 and the line 74 that indicates the cross section of the design surface 45 is hatched, so that the difference in the colors is expressed.

The distance information that indicates the distance between the target surface 70 and the blade tip Pb of the bucket 8 includes numerical value information 83 and graphic information 84. The numerical value information 83 is a numerical value indicating the shortest distance between the blade tip Pb of the bucket 8 and the target surface 70. The graphic information 84 is information graphically indicating the distance between the blade tip Pb of the bucket 8 and the target surface 70. The graphic information 84 is a guidance index that indicates the position of the blade tip Pb of the bucket 8. To be specific, the graphic information 84 includes an index bar 84a, and an index mark 84b that indicates a position where the distance between the blade tip Pb of the bucket 8 and the target surface 70 corresponds to zero, of the index bar 84a. Each of the index bar 84a is lighted according to the shortest distance between a tip end of the bucket 8 and the target surface 70. Note that ON/OFF of display of the graphic information 84 may be changed by an operation of the input unit 41 by the operator of the excavator 100.

As described above, on the rough excavation screen 53, numerical values indicating a relative positional relationship between the line 79 that indicates the cross section of the target surface 70, and the excavator 100, and the shortest distance between the blade tip Pb of the bucket 8, and the line 79 that indicates the cross section of the target surface 70. The operator of the excavator 100 moves the blade tip Pb of the bucket 8 along the line 79 that indicates the cross section of the target surface 70, thereby to easily perform excavation such that the current landform becomes the design landform. Note that, on the rough excavation screen 53, a screen switching key 65 for switching the guide screen is displayed. The operator operates the screen switching key 65, thereby to switch the screen from the rough excavation screen 53 to the fine excavation screen 54.

(Fine Excavation Screen 54)

The fine excavation screen 54 illustrated in FIG. 7 is displayed on a screen 42P of the display unit 42. The fine excavation screen 54 indicates the positional relationship between the target surface 70 and the excavator 100 in more detail than the rough excavation screen 53. That is, the fine excavation screen 54 indicates the positional relationship between the target surface 70 and the blade tip Pb of the bucket 8 in more detail than the rough excavation screen 53. The fine excavation screen 54 includes a front view 54a that indicates the target surface 70 and the bucket 8, and a side view 54b that indicates the target surface 70 and the bucket 8. The front view 54a of the fine excavation screen 54 includes an icon 89 that indicates the bucket 8 in front view, and a line 78 that indicates the cross section of the target surface 70. The front view is a view of the bucket 8 illustrated in FIGS. 1 and 2 as viewed from the vehicle body 1 side, and is a view as viewed from a direction parallel with the Ya axis in a vehicle body coordinate system described below.

The line 78 that indicates the cross section of the target surface 70 is obtained as follows. A line of intersection, which is made when a plane containing a perpendicular line intersects with the target surface 70, when the perpendicular line is drawn from the blade tip Pb of the bucket 8 in the vertical direction (the gravity direction), is the line 78 that indicates the cross section of the target surface 70. That is, the line of intersection becomes the line 78 that indicates the cross section of the target surface 70, in a global coordinate system. Meanwhile, a line of intersection, which is made when a plane containing a line intersects with the target surface 70, when the line is further drawn from the blade tip Pb of the bucket 8 toward the target surface 70, on condition that the line has a parallel positional relationship with a line of the vehicle body 1 in the up and down direction, may be the line 78 that indicates the cross section of the target surface 70. That is, the line of intersection becomes the line 78 that indicates the cross section of the target surface 70, in the vehicle body coordinate system. In which coordinate system, the line 78 that indicates the cross section of the target surface 70 is displayed, can be selected by an operation of a switching key (not illustrated) of the input unit 41 by the operator.

The side view 54b on the fine excavation screen 54 includes an icon 90 of the bucket 8 in side view, the line 74 that indicates the cross section of the design surface 45, and the line 79 that indicates the cross section of the target surface 70. Further, information indicating the positional relationship between the target surface 70 and the bucket 8 is displayed in the front view 54a and the side view 54b on the fine excavation screen 54. The side view is a view as viewed from an extending direction (in a revolving central axis direction of the bucket 8) of the bucket pin 15 illustrated in FIGS. 1 and 2, and is a view as viewed from a direction parallel with the Xa axis in a vehicle body coordinate system described below.

The information indicating the positional relationship between the target surface 70 and the bucket 8 in the front view 54a includes distance information 86a and angle information 86b. The distance information 86a indicates a distance between the blade tip Pb of the bucket 8 and the target surface 70, in a Za direction in the vehicle body coordinate system. Here, the distance information 86a indicated in the front view 54a may be a distance in the global coordinate system Z. This distance is a distance between a closest position to the target surface 70, of positions in the width direction of the blade tip Pb of the bucket 8, and the line 78 that indicates the cross section of the target surface 70. Note that the distance information 86a can be set to non-display. In the front view 54a, a mark 86c that indicates the closest position is superimposed and displayed on the icon 89 of the bucket 8 in front view. The angle information 86b is information indicating an angle between the target surface 70 and the bucket 8. To be specific, the angle information 86b is an angle between a virtual line that passes through the blade tip Pb of the bucket 8, and the line 78 that indicates the cross section of the target surface 70.

In the side view 54b, the information indicating the positional relationship between the target surface 70 and the bucket 8 includes distance information 87a and angle information 87b. The distance information 87a indicates the shortest distance between the blade tip Pb of the bucket 8 and the target surface 70, that is, a distance between the tip end of the bucket 8 and the target surface 70, in a direction perpendicular to the surface of the target surface 70. Alternatively, in the side view 54b, a distance between the blade tip of the bucket 8, and a point where a line drawn from the blade tip Pb in the vertical direction, and the target surface 70 intersect with each other, may be the distance information 87a. Further, the angle information 87b is information that indicates an angle between the target surface 70 and the bucket 8. To be specific, the angle information 87b displayed in the side view 54b is an angle between a bottom surface of the bucket 8, and the line 79 that indicates the cross section of the target surface 70.

The fine excavation screen 54 includes the graphic information 84 that graphically indicates the distance between the blade tip Pb of the bucket 8 and the target surface 70. The graphic information 84 includes the index bar 84a and the index mark 84b, similarly to the graphic information 84 on the rough excavation screen 53. As described above, on the fine excavation screen 54, the line 78 that indicates the cross section of the target surface 70, and a relative positional relationship between the line 79 that indicates the cross section of the target surface 70, and the blade tip Pb of the bucket 8 in detail. The operator of the excavator 100 moves the blade tip Pb of the bucket 8 along the line 78 that indicates the cross section of the target surface 70, and the line 79 that indicates the cross section of the target surface 70, thereby to easily perform excavation such that the current landform becomes to have the same shape as the three-dimensional design landform. Note that the screen switching key 65 is displayed on the fine excavation screen 54, similarly to the rough excavation screen 53. The operator operates the screen switching key 65, thereby to switch the screen from the fine excavation screen 54 to the rough excavation screen 53.

<Method of Obtaining Current Position of Blade Tip Pb of Bucket 8>

The line 79 that indicates the cross section of the target surface 70 is calculated from the current position of blade tip Pb of the bucket 8. The display control device 39 obtains the current position of the blade tip Pb of the bucket 8 in the global coordinate system $\{X, Y, Z\}$, based on detection results of the three-dimensional position sensor 23, the first stroke sensor 16, the second stroke sensor 17, the third stroke sensor 18, the inclination angle sensor 24, and the like. In the present embodiment, the current position of the blade tip Pb of the bucket 8 is obtained as follows.

Figure 8:
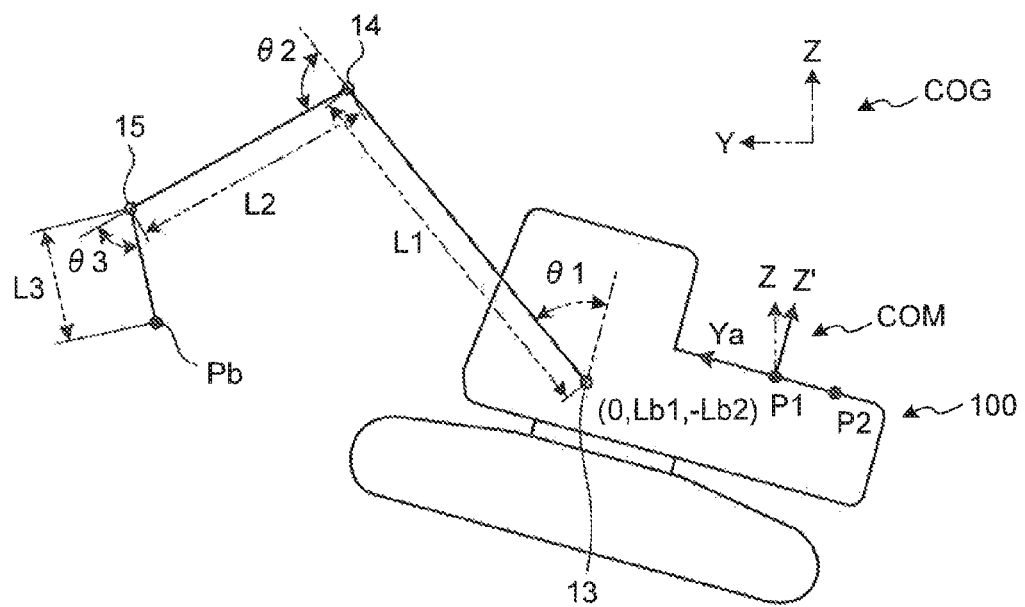
FIG. 8 is a diagram for describing an example of a method of obtaining a current position of a blade tip Pb of a bucket 8.
Figure 9:
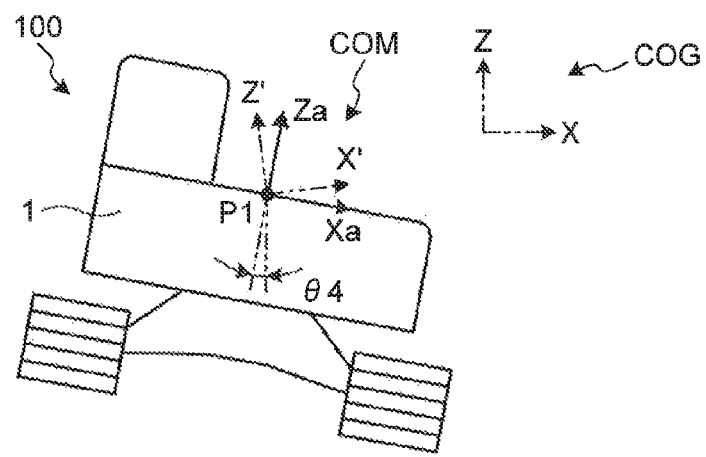
FIG. 9 is a diagram for describing an example of the method of obtaining the current position of the blade tip Pb of the bucket 8.

FIGS. 8 and 9 are diagrams for describing an example of a method of obtaining the current position of the blade tip Pb of the bucket 8. FIG. 8 is a side view of the excavator 100, and FIG. 9 is a side view of the excavator 100. In obtaining the current position of the blade tip Pb of the bucket 8, the display control device 39 obtains a vehicle body coordinate system $\{Xa, Ya, Za\}$ having the installation position P1 of the GNSS antenna 21 as an origin, as illustrated in FIGS. 8 and 9. In this example, a front and back direction of the excavator 100, that is, the Ya axis direction of the coordinate system of the vehicle body 1 (vehicle body coordinate system) COM is inclined with respect to a Y axis direction of the global coordinate system COG. Further, coordinates of the boom pin 13 in the vehicle body coordinate system COM is (0, Lb1, −Lb2), and is stored in the storage unit 43 of the display control device 39 in advance.

The three-dimensional position sensor 23 illustrated in FIGS. 2 and 4 detects the installation positions P1 and P2 of the GNSS antennas 21 and 22. A unit vector in the Ya axis direction is calculated from the detected coordinate positions of the installation positions P1 and P2 by the formula (1).

$$Ya = (P1-P2)/|P1-P2| \qquad (1)$$

As illustrated in FIG. 8, when a vector Z' that passes through a plane expressed by two vectors Ya and Z, and is perpendicular to Ya is introduced, relationships of the formulas (2) and (3) are established. c in the formula (3) is a constant. Z' is expressed from the formulas (2) and (3) like the formula (4). Further, X' is expressed by the formula (5), where a vector perpendicular to Ya and Z' is X'.

$$(Z', Ya) = 0 \qquad (2)$$

$$Z' = (1-c) \times Z + c \times Ya \qquad (3)$$

$$Z' = Z + \{(Z, Ya)/((Z, Ya)-1)\} \times (Ya - Z) \qquad (4)$$

$$X' = Ya \perp Z' \qquad (5)$$

As illustrated in FIG. 9, the vehicle body coordinate system COM is a coordinate system obtained by being rotated around the Ya axis by the roll angle θ4, and thus can be expressed like the formula (6).

$$[Xa\ Ya\ Za] = [X'\ Ya\ Z'] \begin{bmatrix} \cos\theta 4 & 0 & \sin\theta 4 \\ 0 & 1 & 0 \\ -\sin\theta 4 & 0 & \cos\theta 4 \end{bmatrix} \qquad (6)$$

Further, the current inclination angles θ1, θ2, and θ3 of the boom 6, the arm 7, and the bucket 8 are calculated from the detection results of the first stroke sensor 16, the second stroke sensor 17, and the third stroke sensor 18. Coordinates (xat, yat, zat) of the blade tip Pb of the bucket 8 in the vehicle body coordinate system COM can be obtained by the formulas (7), (8), and (9), using the inclination angles θ1, θ2, and θ3 and the lengths L1, L1, and L3 of the boom 6, the arm 7, and the bucket 8. The blade tip Pb of the bucket 8 is moved on a Ya-Za plane of the vehicle body coordinate system COM. The coordinates of the blade tip Pb of the bucket 8 in the global coordinate system COG can be obtained by the formula (10). The coordinates of the blade tip Pb in the global coordinate system COG is the position of the blade tip Pb.

$$xat=0 \tag{7}$$

$$yat=Lb1+L1\times\sin\theta1+L2\times\sin(\theta1+\theta2)+L3\times\sin(\theta1+\theta2+\theta3) \tag{8}$$

$$zat=-Lb2+L1\times\cos\theta1+L2\times\cos(\theta1+\theta2)+L3\times\cos(\theta1+\theta2+\theta3) \tag{9}$$

$$P3=xat\cdot Xa+yat\cdot Ya+zat\cdot Za+P1 \tag{10}$$

The display control device 39 calculates the line of intersection 80 of the plane (hereinafter, appropriately referred to as Ya-Za plane 77) that passes through the three-dimensional design landform, and the blade tip Pb of the bucket 8, based on the current position of the blade tip Pb of the bucket 8 calculated as described above, and the design landform data stored in the storage unit 43, as illustrated in FIG. 5. Then, the display control device 39 displays a portion that passes through the target surface 70, of the line of intersection 80, as the line 79 that indicates the cross section of the target surface 70. Next, an example in which the display control device 39 illustrated in FIG. 4 displays the design surface 45 or the target surface 70 on the screen 42P of the display unit 42 will be described.

<Display of Design Surface 45 or Target Surface 70>

Figure 10:
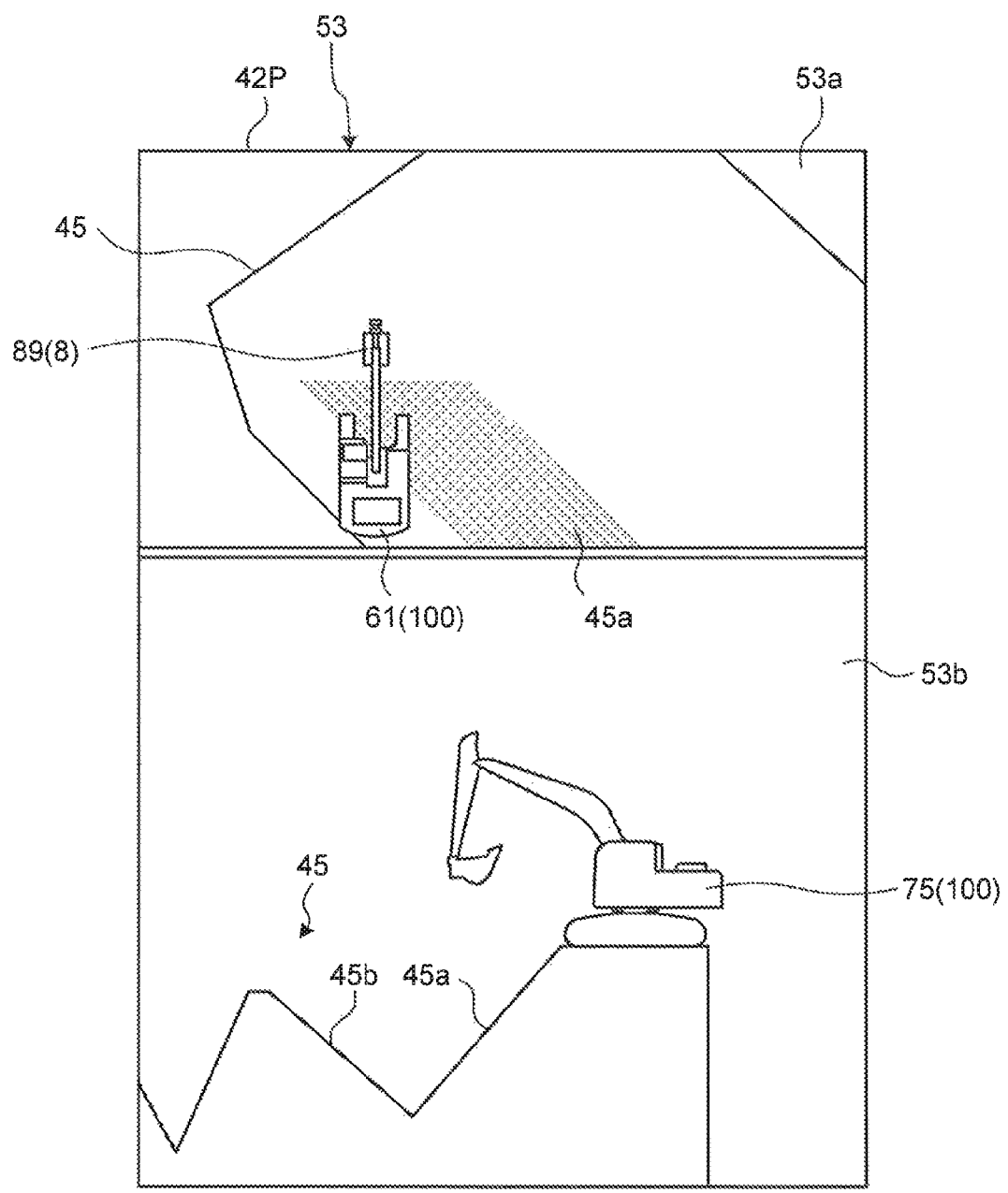
FIG. 10 is a diagram illustrating an example in which a design surface 45 on a rough excavation screen 53 is displayed on a screen 42P of a display unit 42.
Figure 11:
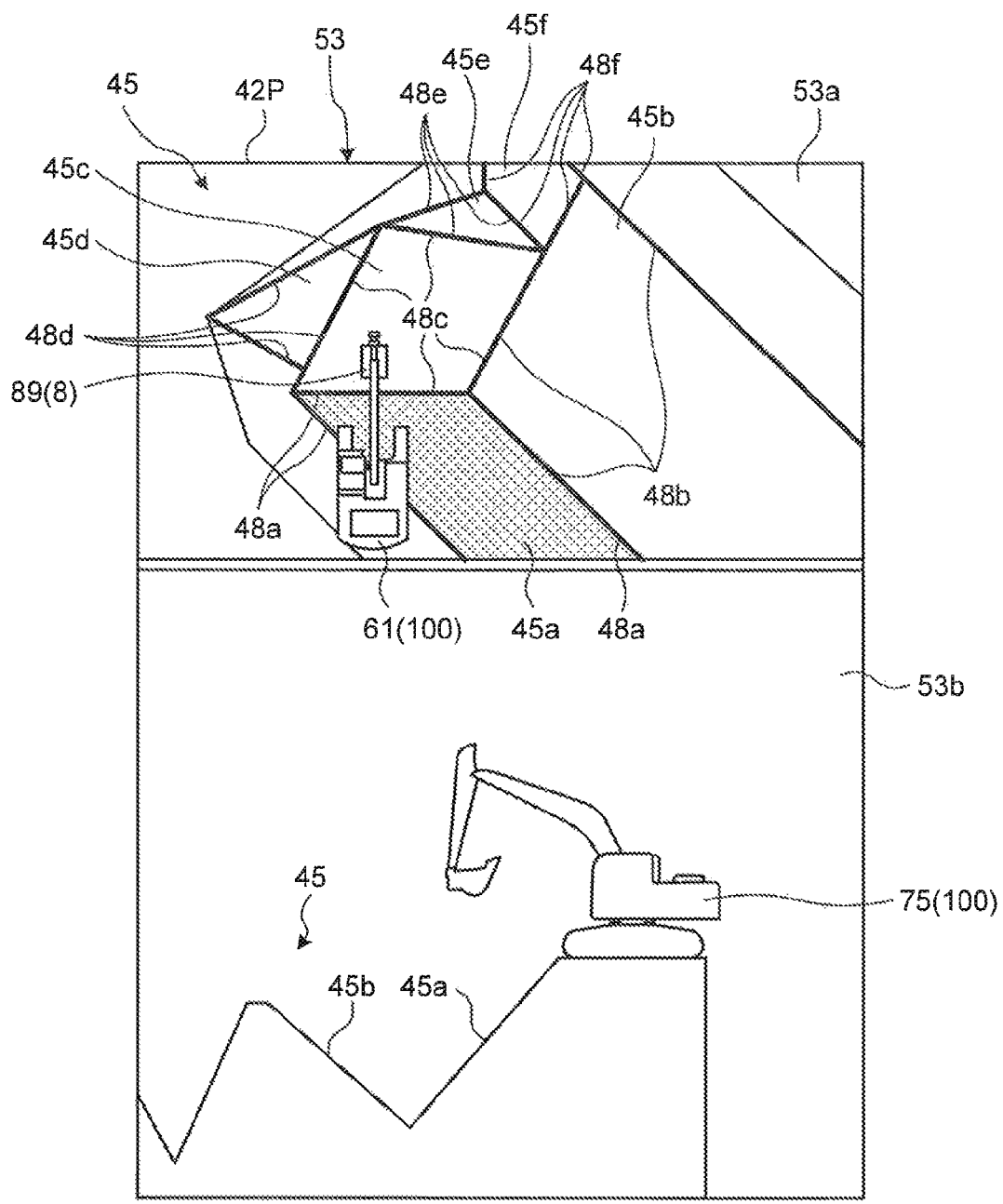
FIG. 11 is a diagram illustrating an example of the design surface 45 on the rough excavation screen 53 is displayed on the screen 42P of the display unit 42.

FIGS. 10 and 11 are diagrams illustrating an example in which the design surface 45 on the rough excavation screen 53 is displayed on the screen 42P of the display unit 42. In the following description, display of the design surface 45 or the target surface 70 on the rough excavation screen 53 will be described. However, the same applies to the fine excavation screen 54. As illustrated in FIG. 5, the design surface 45 includes the plurality of surface elements 47. When the design surface 45 or the target surface 70 is displayed in the top view 53a on the screen 42P, if the surface elements 47 are displayed at the same time, the operator of the excavator 100 less easily recognizes the design surface 45 or the target surface 70. Therefore, the display control device 39, to be more specific, the processing unit 44 deletes the surface elements 47, and displays the design surface 45 or the target surface 70 on the screen 42P of the display unit 42.

When the design surface 45 or the target surface 70 is displayed on the screen 42P of the display unit 42, the design surface 45 includes a second surface 45b adjacent to a first surface 45a, as illustrated in the side view 53b, not be seen in the top view 53a. Therefore, the processing unit 44 displays, on the screen 42P, light and shade that occurs when the design surface 45 is irradiated with light from a predetermined direction, i.e., from a rear portion (the opposite side to the bucket 8 indicated by the icon 89) of the excavator 100 indicated by the icon 61 in this example. As a result, the first surface 45a that is a plane of a part of the design surface 45 is displayed with a shadow as a dark portion, and thus can be distinguished from other surfaces of the design surface 45. When displaying the light and shade on the screen 42P, the processing unit 44 displays, on the screen 42P, the light and shade that occurs when the design surface 45 is irradiated with parallel light from the rear portion of the excavator 100.

When the upper swing body 3 of the excavator 100 swings, or the excavator 100 is moved or swings, the processing unit 44 changes and displays, corresponding to the swing or the movement, the positional relationship between the icon 61 illustrating the excavator 100 and the design surface 45, on the screen 42P. At this time, in the present embodiment, the processing unit 44 always irradiates the design surface 45 with light from the rear portion of the excavator 100.

Since the direction from which the design surface is irradiated with light is changed due to the movement of the excavator 100 or the like, the light and shade is displayed on other surfaces in addition to the first surface 45a, by the movement of the excavator 100 or the like, where the design surface 45 includes a plurality of surfaces, in addition to the first surface 45a. Therefore, the operator can visually recognizes the surfaces other than the first surface 45a, of the plurality of surfaces included in the design surface 45, by the movement of the excavator 100 or the like. However, when the excavator 100 is not moved or the like, the operator may be able to distinguish only one surface (the first surface 45a in the example illustrated in FIG. 10), of the plurality of surfaces, even if the design surface 45 includes a plurality of surfaces. Typically, the light and shade of a surface is determined according to reflectance of light. Therefore, for example, if there is a plurality of completely different surfaces, such as two slopes included in a V-shaped valley, a difference in the light and shade is small if the reflectances of these surfaces are close. As a result, the operator may not be able to distinguish these surfaces, and cannot obtain sufficient information from the screen 42P that displays the design surface 45. Especially, when the design surface 45 is two-dimensionally displayed with a bird's-eye view as viewed from the top view 53a, i.e., above the excavator 100, the problem that the different planes cannot be distinguished becomes more remarkable.

Therefore, in the present embodiment, the display unit 42 displays, on the screen 42P, outer edges of the plurality of surfaces (planes) included in the design surface 45, in different forms from other portions. In this example, the outer edges of the surfaces are displayed with solid lines. In doing so, the operator of the excavator 100 can identify the plurality of surfaces (planes) included in the design surface 45, and thus can obtain sufficient information from the screen 42P that displays the design surface 45. Especially, when the design surface 45 is two-dimensionally expressed in a bird's-eye view as viewed from above the excavator 100, the operator can easily identify the plurality of different planes. Further, the plurality of surface elements 47 is not displayed, and thus the operator can easily recognize the plurality of surfaces included in the design surface 45.

In the example illustrated in FIG. 11, the design surface 45 includes the first surface 45a, the second surface 45b, a third surface 45c, a fourth surface 45d, a fifth surface 45e, and a sixth surface 45f. Outer edges 48a to 48f of the respective surfaces are displayed by a solid line, whereby the operator of the excavator 100 can obtain detailed information of the design surface 45 from the top view 53a displayed on the screen 42P. Next, processing of displaying the outer edge 48a of the first surface 45a and the like in a different form from others, which is performed by the processing unit 44, will be described.

Figure 12:
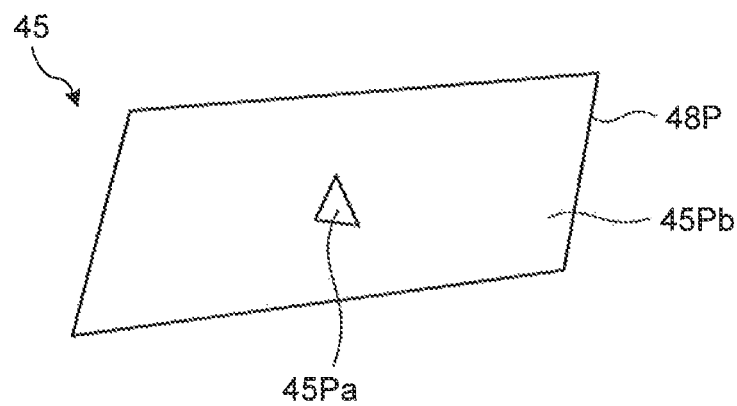
FIG. 12 is a diagram for describing processing of displaying an outer edge of a plane included in the design surface 45 in a different form from others.
Figure 13:
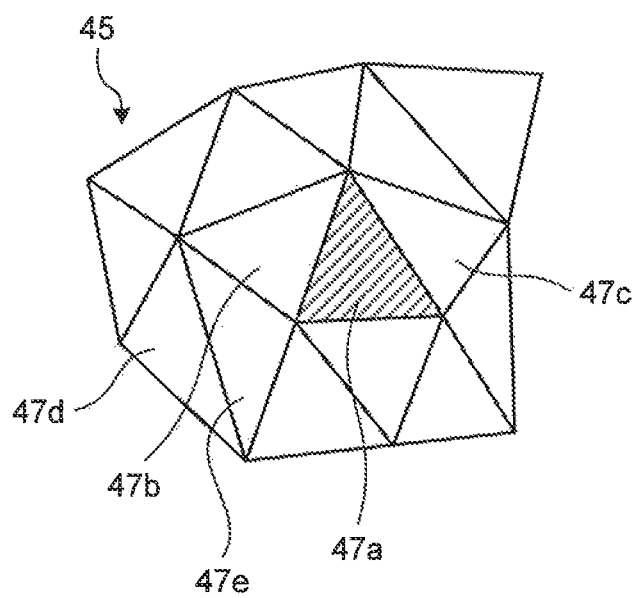
FIG. 13 is a plan view illustrating a plurality of surface elements 47a to 47e included in the design surface 45.

FIG. 12 is a diagram for describing processing of displaying an outer edge of a plane included in the design surface 45, in a different form from others. FIG. 13 is a plan view illustrating a plurality of surface elements 47a to 47e included in the design surface 45. For convenience, in FIG. 13, five surface elements, of the plurality of surface elements (indicated by triangles) included in the design surface 45, are denoted with the reference signs 47a to 47e. Hereinafter, when the surface elements 47a to 47e are not distinguished, they are simply called surface elements 47.

As illustrated in FIG. 12, in the present embodiment, the processing unit 44 displays an outer edge 48P of a second plane 45Pb that includes a first plane 45Pa existing in the design surface 45, and exists in at least a part of a periphery (all of the periphery in this example) of the first plane 45Pa, of the design surface 45, on the screen 42P of the display unit 42, in a different form from the inside and outside of the outer edge 48P.

In the present embodiment, the first plane 45Pa illustrated in FIG. 12 is the surface element 47a illustrated in FIG. 13. The second plane 45Pb illustrated in FIG. 12 is surface elements that can be considered to be the same plane as the surface element 47a, of surface elements 47b to 47e existing in at least a part of the periphery of the surface element 47a illustrated in FIG. 13. The design surface 45 is created based on measured data, and the like. Further, the design surface 45 includes the plurality of surface elements 47, as described above, but the surface elements 47 have finite sizes, and thus the design surface 45 is expressed with the plurality of surface elements 47 in a discrete manner. Therefore, even if the design surface 45 is a plane, the plurality of surface elements 47 included in the design surface 45 does not necessarily exist in the same plane. Therefore, the second plane 45Pb is configured from the surface elements that can be considered to be the same plane as the surface element 47a, of the surface elements 47 existing in at least a part of the periphery of the surface element 47a as the first plane 45Pa. The processing unit 44 extracts the surface elements that can be considered to exist in the same plane, of the plurality of surface elements 47, and causes the set of the extracted surface elements 47 to be the second plane 45Pb. Then, the processing unit 44 displays position information of the outer edge 48P of the second plane 45Pb, on the screen 42P of the display unit 42, in a different form from the inside and the outside of the outer edge 48P.

Figure 14:
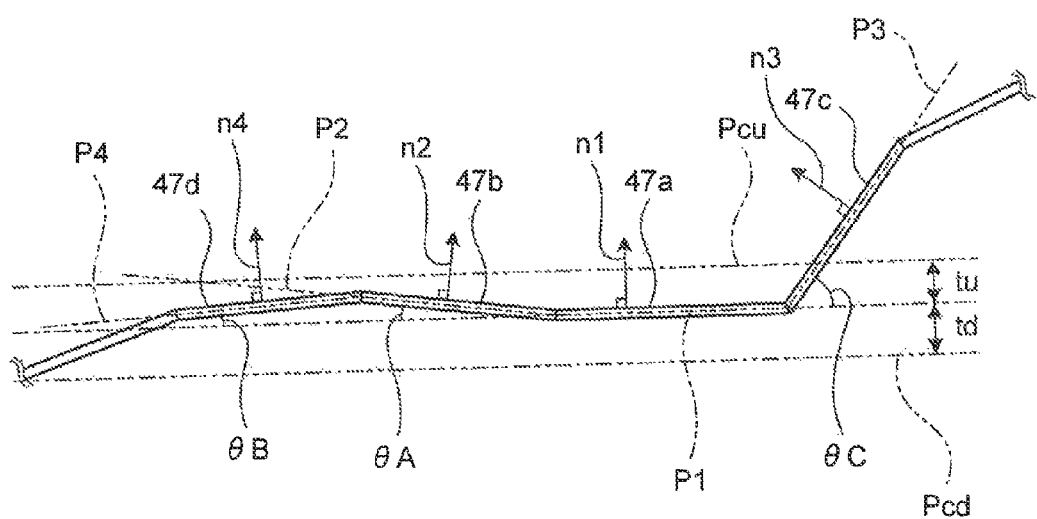
FIG. 14 is a side view illustrating a plurality of surface elements 47a to 47d included in the design surface 45.

FIG. 14 is a side view illustrating the plurality of surface elements 47a to 47d included in the design surface 45. An example of determination of considering the surface elements 47b to 47d existing in at least a part of the periphery of one surface element 47a included in the design surface 45 to exist in the same plane as the surface element 47a (hereinafter, appropriately referred to as same surface determination) will be described with reference to FIG. 14. Note that the same surface determination is not limited to the example described below.

In executing the same surface determination, first, consider a plane P1 in which the surface element 47a (in the following description, appropriately referred to as specific surface element 47a) exists. The specific surface element 47a is a part of the plane P1. As the specific surface element 47a that serves as a reference of the same surface determination, a surface element existing directly below the blade tip Pb, or a surface element existing in the center of the top view 53a of the rough excavation screen 53 illustrated in FIG. 6 is employed. Further, consider two planes Pcu and Pcd existing at positions away by predetermined distances tu and td, in opposite directions from the plane P1, and in a direction perpendicular to the plane P1, that is, to the specific surface element 47a as the first plane 45Pa. The predetermined distances tu and td can be, but not limited to, about ±50 mm, for example. In the present embodiment, for example, the surface elements 47 other than the specific surface element 47a, which exist in a range surrounded by the planes Pcu and Pcd are determined to exist in the same plane as the specific surface element 47a. According to the same surface determination, all of the surface elements 47b and 47d exist in the range surrounded by the planes Pcu and Pcd, and thus are in the same plane as the specific surface element 47a and become the second plane 45Pb. As for the surface element 47c, not all of the surface elements exist in the range surrounded by the planes Pcu and Pcd, and there is no plane which is in the same plane to the specific surface element 47a and the surface element 47c does not become the second plane 45Pb.

The same surface determination is executed by the processing unit 44. When the same surface determination is executed, the processing unit 44 acquires the position information of the design surface 45 from the storage unit 43 illustrated in FIG. 4. Then, the processing unit 44 sets the specific surface element 47a, then generates the planes Pcu and Pcd from the position information of the specific surface element 47a, and extracts the surface elements 47, all of which exist in the range surrounded by the planes Pcu and Pcd. Following that, the processing unit 44 generates the second plane 45Pb from the position information of the extracted surface elements 47 and the specific surface element 47a, and stores the second plane 45Pb in the storage unit 43. The processing unit 44 extracts the position information of the outer edge 48P from the position information of the generated second plane 45Pb, and displays the outer edge 48P, on the screen 42P of the display unit 42, in a different form from the inside and the outside of the outer edge 48P, by a different line or different color, for example.

Further, as another example of the same surface determination, when an angle made by the plane P1 in which the specific surface element 47a exists, and a plane in which another surface element 47 or another surface element exists is a predetermined threshold $\theta t$ or less, such a surface element 47 is determined to exist in the same plane as the specific surface element 47a. For example, in the example illustrated in FIG. 14, both of an angle $\theta A$ made by the plane P1 in which the specific surface element 47a exists and a plane P2 in which the surface element 47b exists, and an angle $\theta B$ made by the plane P1 in which the specific surface element 47a exists and a plane P4 in which the surface element 47d exists are a threshold $\theta t$ or less. In this case, assume that the surface elements 47b and 47d are in the same plane as the specific surface element 47a, and become the second plane 45Pb. Further, assume that an angle $\theta C$ made by the plane P1 in which the specific surface element 47a exists and a plane P3 in which the surface element 47c exists is larger than the threshold $\theta t$. In this case, the surface element 47c is not in the same plane as the specific surface element 47a, and does not become the second plane 45Pb. The threshold $\theta t$ can be, but not limited to, ±1 degree, for example.

When the same surface determination is executed, the processing unit 44 acquires the position information of the design surface 45 from the storage unit 43 illustrated in FIG. 4. Then, the processing unit 44 sets the specific surface element 47a, then generates the plane P1 from the position information of the specific surface element 47a, and obtains the angles $\theta A$ and $\theta C$ made by the planes P2 and P3, in which the surface elements 47b and 47c exist, and the plane P1. Following that, the processing unit 44 compares the obtained angles $\theta A$ and $\theta C$, and the threshold $\theta t$, and extracts the surface elements 47 with the angle $\theta t$ or less. The processing unit 44 generates the second plane 45Pb from the position information of the extracted surface elements 47 and the specific surface element 47a, and stores the second plane 45Pb in the storage unit 43. The processing unit 44 extracts the position information of the outer edge 48P from the position information of the generated second plane 45Pb, and displays the outer edge 48P, on the screen 42P of the display unit 42, in a different form from the inside and the outside of the outer edge 48P.

The same surface determination may be executed using normal vectors n1, n2, n3, and n4 of the plane P1, P2, P3, P4, and angles made by these normal vectors, instead of the angles made by the plane P1 in which the specific surface element 47a exists, and the planes in which the other surface elements 47 or other surface element exist. In this case, the threshold θt described above can be used. The normal vectors n1, n2, n3, and n4 are stored in the storage unit 43 of the display control device 39 illustrated in FIG. 4, as one of information of the design surface 45. Therefore, the processing unit 44 can easily realize the same surface determination using the normal vectors n1, n2, n3, and n4.

Further, the same plane determination may be executed as follows. First, the same plane determination is started between the specific surface element 47a, and the adjacent surface element 47b or 47c. When there is the surface element 47 determined to exist in the same plane as the specific surface element 47a, the same plane determination is performed between the surface element 47 and adjacent surface elements 47. This process is repeated throughout the entire periphery of the specific surface element 47a until no surface element 47 determined to exist in the same plane as the specific surface element 47a exists.

In the example illustrated in FIG. 14, the processing unit 44 executes, first, the same plane determination between the specific surface element 47a, and the adjacent surface elements 47b and 47c. When the specific surface element 47a and the surface element 47b are determined to exist in the same plane, the processing unit 44 then executes the same surface determination between the surface element 47b and the adjacent surface element 47d. As described above, the processing unit 44 sequentially executes the same surface determination, based on the surface element 47 that is determined to exist in the same surface as the adjacent surface element 47. When there is a surface element determined not to exist in the same surface (the surface element 47c in the example illustrated in FIG. 14), the processing unit 44 terminates the same surface determination.

When the same surface determination is sequentially performed among the adjacent surface elements 47, whether the angle made by the surface elements 47, which are to be subjected to the same surface determination, is the threshold θt or less, is determined. Further, whether one of the adjacent two surface elements 47 exists in the range surrounded by two planes that exist at positions away by predetermined distances, in the opposite directions from the other surface element 47, and in a direction perpendicular to the other surface element 47, is determined.

When the same surface determination including the specific surface element 47a is completed, the processing unit 44 employs the surface element determined not to exist in the same surface at the end of the same surface determination, as a new specific surface element. Then, the processing unit 44 executes the same surface determination using the new specific surface element, and extracts a plurality of surface elements that can be considered to exist in the same plane as the specific surface element. The processing unit 44 repeats the same surface determination. Then, the processing unit 44 extracts a plurality of planes including the plurality of surface elements that can be considered to exist in the same plane, with respect to the entire range of the top view 53a of the rough excavation screen 53 displayed on the screen 42P of the display unit 42. That is, the processing unit 44 does not necessarily execute the same surface determination with respect to all portions of the design surface 45.

Further, the new specific surface element may not be the surface element determined not to exist in the same surface at the end of the same surface determination. For example, the processing unit 44 may employ a surface element to which the same surface determination has not been executed, and existing at a position different from the extracted plane, in the top view 53a of the rough excavation screen 53 illustrated in FIG. 6, as the new specific surface element. The process of the same surface determination for extracting the plurality of planes is not limited to the above example.

In the present embodiment, the processing unit 44 executes the same surface determination, and generates the second plane 45Pb from the design surface 45 displayed on the screen 42P of the display unit 42. Then, the processing unit 44 extracts the outer edge 48P of the generated second plane 45Pb, and displays the outer edge 48P on the screen 42P in the different form from the inside and the outside of the outer edge 48P. In doing so, the operator of the excavator 100 can visually recognize the plurality of surfaces included in the design surface 45. As a result, when the operator of the excavator 100 proceeds with the construction according to the design surface 45, the display system 28 illustrated in FIG. 4 can provide the operator with the information related to the construction in an easily understandable manner.

In the present embodiment, the processing unit 44 may display the position information of the design surface 45, the outer edges 48a to 48f, and the icon 61 as a pattern corresponding to the excavator 100, on the same screen 42P of the display unit 42, as illustrated in FIG. 11. In doing so, the operator of the excavator 100 can easily grasp the positional relationship between the excavator 100 operated by himself/herself, and the design surface 45. The processing unit 44 calculates the position where the icon 61 is displayed with respect to the design surface 45, based on the position and the posture of the excavator 100 detected by the position detection unit 19 and the vehicle state detection unit as the posture detection unit, and displays the icon 61 on the screen 42P.

Further, the processing unit 44 may display a plurality of different first planes 45Pa, and outer edges 48P of second planes 45Pb corresponding to respective first planes 45Pa, on the same screen 42P of the display unit 42, in different forms from insides and outsides of the outer edges 48P. That is, as illustrated in FIG. 11, the processing unit 44 may display the plurality of first surface 45a to the sixth surface 45f (these are corresponding to the second plane 45Pb illustrated in FIG. 12) and the outer edges 48a to 48f of these surfaces, on the same screen 42P, as illustrated in FIG. 11. In doing so, the operator of the excavator 100 can easily grasp the information of the design surface 45. At this time, the processing unit 44 may display the target surface 70, of the design surface 45, in a different form from other parts of the design surface 45, for example, in a different color or by blinking. In doing so, the operator can easily grasp the target surface 70 from the design surface 45.

Further, in the present embodiment, when displaying the light and shade that occurs when irradiating the design surface 45 with light from a predetermined direction, on the screen 42P of the display unit 42 together with the design surface 45, the processing unit 44 may irradiate the design surface 45 with light from the position of the light 20A or the light 20B attached to the excavator 100. In this case, the light becomes light irradiated from a point light source. Then, the processing unit 44 displays the light and shade that occurs on the design surface 45 by the light irradiated from the light 20A or the light 20B, on the screen 42P of the display unit 42. In doing so, the direction from which the design surface 45 is irradiated with the light is differentiated according to the swing of the upper swing body 3 or the movement of the excavator 100, and the light and shade is displayed. As a result, the operator of the excavator 100 can visually recognize the light and shade of the design surface 45 with a view based on the own vehicle, and thus can more intuitively understand the information of the design surface 45.

The display system 28 illustrated in FIG. 4 may include a display switching unit that transmits a display switching command for displaying the inside of the outer edge 48P of the second plane 45Pb in a different form from the outside the outer edge 48P. For example, the input unit 41 of the display input device 38 can be used as the display switching unit. Then, when having received the display switching command from the input unit 41, the processing unit 44 may display the inside of the outer edge 48P in a different form from the outside of the outer edge 48P, for example, in a different color or by blinking, on the screen 42P of the display unit 42. In doing so, the operator of the excavator 100 can voluntarily switch the display and non-display of the outer edge 48P, and thus convenience is improved. Further, the operator can more easily understand the information of the design surface 45. When there is a plurality of second planes 45Pb displayed on the same screen 42P, the insides of the respective outer edges 48P can be displayed in different forms from one another. In doing so, the operator can easily distinguish the respective second planes 45Pb, and thus it is favorable.

In the present embodiment, the processing unit 44 displays the outer edge 48P of the second plane 45Pb in different forms from the inside and the outside of the outer edge 48P. The processing unit 44 may display a plane that includes a portion of the design surface 45 specified by the operator of the excavator 100, in a different form from inside and outside of an outer edge of the plane. For example, the processing unit 44 generates a plane including a portion specified by the operator using the input unit 41 of the display input device 38 illustrated in FIG. 4, as the second plane 45Pb, from the position information of the design surface 45 corresponding to the specified portion, and displays the outer edge 48P on the screen 42P, in a different form from the inside and the outside of the outer edge 48P. In doing so, the operator can voluntarily switch the display and non-display of the outer edge 48P, and thus convenience is improved.

Further, the processing unit 44 may display at least the outer edge 48P of the second plane 45Pb existing directly below the bucket 8, on the screen 42P of the display unit 42, in a different form from the inside and the outside of the outer edge 48P. In the example illustrated in FIG. 11, the processing unit 44 displays an outer edge 48c of the third surface 45c (corresponding to the second plane 45Pb) existing directly below the icon 89 corresponding to the bucket 8, in a different form from inside and outside of the outer edge 48c. Since the portion directly below the bucket 8 is usually the target surface 70, and thus the operator of the excavator 100 can easily grasp the target surface 70 from the design surface 45.

When displaying the design surface 45 in the top view 53a, the processing unit 44 desirably displays the design surface 45, based on brown with shading according to the irradiation of the light. In doing so, the expression gets closer to reality, and thus the operator of the excavator 100 can visually recognize the state of the design surface 45 in a more intuitive manner. Further, the processing unit 44 may display the inside of the outer edge of the plane that includes the portion specified by the operator, in white, for example. Further, the processing unit 44 may display the inside of the outer edge of the plane existing directly below the bucket 8, in white, for example.

While the present embodiment has been described as described above, the present embodiment is not limited by the above-described content. Further, the above-described configuration elements include matters that can be easily arrived at by a person skilled in the art, are substantially the same, and fall within so-called equivalents. Further, the above-described configuration elements can be appropriately combined. Further, various types of omission, replacement, and change of the configuration elements can be made without departing from the gist of the present embodiment.

For example, the content of the guide screens are not limited to the above examples, and may be appropriately changed. Further, a part or all of the functions of the display control device 39 may be executed by a computer arranged outside the excavator 100. Further, the target work object is not limited to the plane as described above, and may be a point, a line, or a three-dimensional shape. The input unit 41 of the display input device 38 is not limited to one in a touch panel system, and may be configured from operation members such as hard keys and switches.

While, in the above-described embodiment, the work machine 2 includes the boom 6, the arm 7, and the bucket 8, the work machine 2 is not limited to the embodiment, and may be one that includes at least the bucket 8. Further, while, in the above-described embodiment, the inclination angles of the boom 6, the arm 7, and the bucket 8 are detected by the first stroke sensor 16, the second stroke sensor 17, and the third stroke sensor 18, the detection means of the inclination angles is not limited thereto. For example, angle sensors that detect the inclination angles of the boom 6, the arm 7, and the bucket 8 may be included.

While, in the above-described embodiment, the work machine 2 includes the bucket 8, the bucket is not limited thereto, and another attachment such as a tilt bucket or a slope bucket may be attached. The tilt bucket includes a bucket tilt cylinder, and can form and level a slope or a level ground into an arbitrary form, even if the excavator exists on a slope ground, by tilting the bucket right and left, and also can perform rolling compaction work with a bottom plate. The slope bucket has a flat bottom surface, and is suitable for leveling work of a plane or a slope.

REFERENCE SIGNS LIST

1 Vehicle body
2 Work machine
3 Upper swing body
4 Operator cab
5 Traveling device
6 Boom
7 Arm
8 Bucket
8B Blade
10 Boom cylinder
11 Arm cylinder
12 Bucket cylinder
19 Position detection unit
20A and 20B Light
23 Three-dimensional position sensor
28 Display system of excavating machine (display system)
28 Display input device
39 Display control device
41 Input unit
42 Display unit
42P Screen
43 Storage unit 44 Processing unit
45 Design surface
45Pa First plane
45Pb Second plane
45a to 45f First surface to Sixth surface
47 Surface element
47a Specific surface element (surface element)
47b to 47e Surface element
48P, 48a to 48f Outer edge
53 Rough excavation screen
54 Fine excavation screen
61, 75, 89, and 90 Icon
70 Target surface
100 Excavator
Pcu and Pcd Plane
tu and td Predetermined distance

The invention claimed is:

1. A display system of an excavating machine that includes a work machine having a bucket, and a main body to which the work machine is attached, and that is configured to perform construction according to a design surface, the display system comprising:
 a storage unit configured to store at least position information of the design surface;
 a display unit configured to display the position information of the design surface on a screen; and
 a processing unit configured to display an outer edge of a second plane of the design surface, the second plane including a first plane existing in the design surface, the second plane existing in a part of a periphery of the first plane, on the screen of the display unit, in different forms as between the inside and the outside of the outer edges.

2. The display system of an excavating machine according to claim 1, wherein
 the design surface is divided by a plurality of surface elements,
 the first plane is one of the plurality of surface elements, and
 the second plane is at least one of the plurality of surface elements, the one existing in the periphery of the first plane, and is able to be considered to exist in a same plane as the surface element corresponding to the first plane.

3. The display system of an excavating machine according to claim 1, wherein
 the processing unit displays the position information of the design surface, the outer edge, and a pattern corresponding to the excavating machine, on a same screen of the display unit.

4. The display system of an excavating machine according to claim 1, wherein
 the processing unit displays a plurality of the different first planes, and the outer edges of the second planes corresponding to the respective first planes, on a same screen of the display unit, in different forms from the inside and outside of the outer edges.

5. The display system of an excavating machine according to claim 1, wherein
 the processing unit displays light and shade that occurs when the design surface is irradiated with light from a predetermined direction, on the screen of the display unit, together with the design surface.

6. The display system of an excavating machine according to claim 5, wherein
 the processing unit irradiates the design surface with the light from a position of a light attached to the excavating machine.

7. The display system of an excavating machine according to claim 1, comprising:
 a display switching unit configured to transmit a display switching command for displaying the inside of the outer edge in a different form from the outside of the outer edge, wherein
 when the processing unit receives the display switching command from the display switching unit, the processing unit displays the inside of the outer edge, on the screen of the display unit, in a different form from the outside of the outer edge.

8. The display system of an excavating machine according to claim 1, wherein
 the processing unit displays at least the outer edge of the second plane existing directly below the bucket, on the screen of the display unit, in a different form from the inside and the outside of the outer edge.

9. A display system of an excavating machine that includes a work machine having a bucket, and a main body to which the work machine is attached, and that is configured to perform construction according to a design surface, the display system comprising:
 a storage unit configured to store at least position information of the design surface divided by a plurality of surface elements;
 a display unit configured to display the position information of the design surface on a screen;
 a vehicle state detection unit configured to detect at least information related to a current position of the excavating machine; and
 a processing unit configured to display an outer edge of a second plane of the design surface, the second plane including a first plane existing in the design surface, the second plane existing in a part of a periphery of the first plane, on the screen of the display unit, in different forms as between the inside and the outside of the outer edges, and further to display a pattern corresponding to the excavating machine, on the same screen as the outer edge of the second plane, wherein
 the second plane exists in a range surrounded by two planes existing in positions away from the first plane by a predetermined distance, in a direction perpendicular to the first plane.

10. An excavating machine comprising:
 a display system of the excavating machine according to claim 1.

* * * * *